US012767072B2

(12) United States Patent
Tomosada et al.

(10) Patent No.: US 12,767,072 B2

(45) Date of Patent: Oct. 20, 2026

(54) ROUTING STRUCTURE

(71) Applicant: YAZAKI CORPORATION, Tokyo (JP)

(72) Inventors: Kosuke Tomosada, Makinohara (JP); Naoto Kogure, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 217 days.

(21) Appl. No.: 18/940,747

(22) Filed: Nov. 7, 2024

(65) Prior Publication Data

US 2025/0153666 A1 May 15, 2025

(30) Foreign Application Priority Data

Nov. 13, 2023 (JP) ................................ 2023-192662

(51) Int. Cl.

*B60R 16/02* (2006.01)
*B60J 7/04* (2006.01)
*B60R 16/027* (2006.01)

(52) U.S. Cl.

CPC ............... *B60R 16/027* (2013.01); *B60J 7/04* (2013.01); *B60R 16/0215* (2013.01)

(58) Field of Classification Search

CPC ...... B60R 16/0215; B60R 16/027; B60J 7/04; B60J 7/043; B60J 7/053; B60J 7/057

See application file for complete search history.

(56) References Cited

U.S. PATENT DOCUMENTS 6,492,592 B1 * 12/2002 Murofushi .......... B60R 16/0215 174/72 A
7,265,294 B2 * 9/2007 Tsunoda ................. H02G 11/00 174/72 A
2008/0142260 A1 * 6/2008 Yamaguchi .......... B60N 2/0224 174/72 A
2019/0165530 A1 * 5/2019 Katsuramaki .......... B60J 7/0573
2024/0300422 A1 * 9/2024 Oishi ......................... F16B 5/06
2025/0100472 A1 * 3/2025 Tomosada ........... B60R 16/0215
2025/0100473 A1 * 3/2025 Tomosada ........... B60R 16/0215
2025/0100474 A1 * 3/2025 Tomosada ........... B60R 16/0215
2025/0100483 A1 * 3/2025 Tomosada ........... B60R 16/0215
2025/0100484 A1 * 3/2025 Tomosada ........... B60R 16/0215
2025/0100485 A1 * 3/2025 Tomosada .................. B60J 7/02
2025/0153662 A1 * 5/2025 Tomosada ........... B60R 16/0215
2025/0153663 A1 * 5/2025 Tomosada ........... B60R 16/0215
2025/0153664 A1 * 5/2025 Tomosada ........... B60R 16/0215

(Continued)

FOREIGN PATENT DOCUMENTS

JP 2011-151906 A 8/2011

*Primary Examiner* — Gregory A Blankenship

(74) *Attorney, Agent, or Firm* — KENEALY VAIDYA LLP

(57) ABSTRACT

A routing structure includes a first fixing part fixed to a rail, a second fixing part fixed to a slide body, a tubular exterior member, a biasing member inserted through the exterior member and having a curved portion curved in a vehicle front-rear direction at a position between a first end portion and a second end portion of the exterior member, and a support structure supporting the biasing member. The support structure includes at least one of a first support structure that forms a first arcuate portion in the curved portion and a second support structure that forms a second arcuate portion in the curved portion.

4 Claims, 9 Drawing Sheets

(56) References Cited

U.S. PATENT DOCUMENTS

| | | | | |
|---|---|---|---|---|
| 2025/0153665 | A1* | 5/2025 | Tomosada | B60R 16/027 |
| 2025/0153666 | A1* | 5/2025 | Tomosada | B60R 16/0215 |
| 2025/0158375 | A1* | 5/2025 | Tomosada | H02G 3/0462 |
| 2025/0158376 | A1* | 5/2025 | Tomosada | B60R 16/0215 |

* cited by examiner

ROUTING STRUCTURE

CROSS-REFERENCE TO RELATED APPLICATION(S)

The present application claims priority to and incorporates by reference the entire contents of Japanese Patent Application No. 2023-192662 filed in Japan on Nov. 13, 2023.

BACKGROUND OF THE INVENTION

1. Field of the Invention

The present invention relates to a routing structure.

2. Description of the Related Art

Conventionally, there is a power feeding device for a slide body. Japanese Patent Application Laid-open No. 2011-151906 discloses a power feeding device for a slide body including a wire harness routed over a vehicle body and a slide body that is slidably provided on the vehicle body and opens and closes an opening formed in the vehicle body.

It has been studied by the inventor of the present application to arrange a biasing member having rigidity inside an exterior member when the exterior member is included in a routing structure between a vehicle body and a slide body. Here, in a case where the biasing member is curved in a narrow space between the vehicle body and the slide body, the biasing member is likely to have a tapered shape in the curved portion. The tapered shape of the curved portion causes a decrease in bending radius of an electric wire.

SUMMARY OF THE INVENTION

An object of the present invention is to provide a routing structure capable of suppressing a biasing member from having a tapered shape.

A routing structure according to one aspect of the invention includes a first fixing part fixed to a rail disposed on a vehicle body of a vehicle, and extending in a vehicle front-rear direction; a second fixing part fixed to a slide body that moves along the vehicle front-rear direction with respect to an opening provided in a roof of the vehicle body; a tubular exterior member having a first end portion held by the first fixing part and a second end portion held by the second fixing part; an electric wire inserted through the exterior member; a biasing member inserted through the exterior member, and having a curved portion curved in the vehicle front-rear direction at a position between the first end portion and the second end portion; and a support structure supporting the biasing member, wherein the support structure includes at least one of a first support structure that forms a first arcuate portion in the curved portion and a second support structure that forms a second arcuate portion in the curved portion, the first arcuate portion is formed in a portion of the curved portion along the rail, and has an arcuate shape convex toward a lower side in a vehicle up-down direction, and the second arcuate portion is formed in a portion of the curved portion along the slide body, and has an arcuate shape convex toward an upper side in the vehicle up-down direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a routing structure according to an embodiment of the present invention will be described in detail with reference to the drawings. Note that the present invention is not limited by the present embodiment. In addition, the components in the following embodiment include those that can be easily imagined by those skilled in the art or those that are substantially the same.

Embodiment

Figure 1:
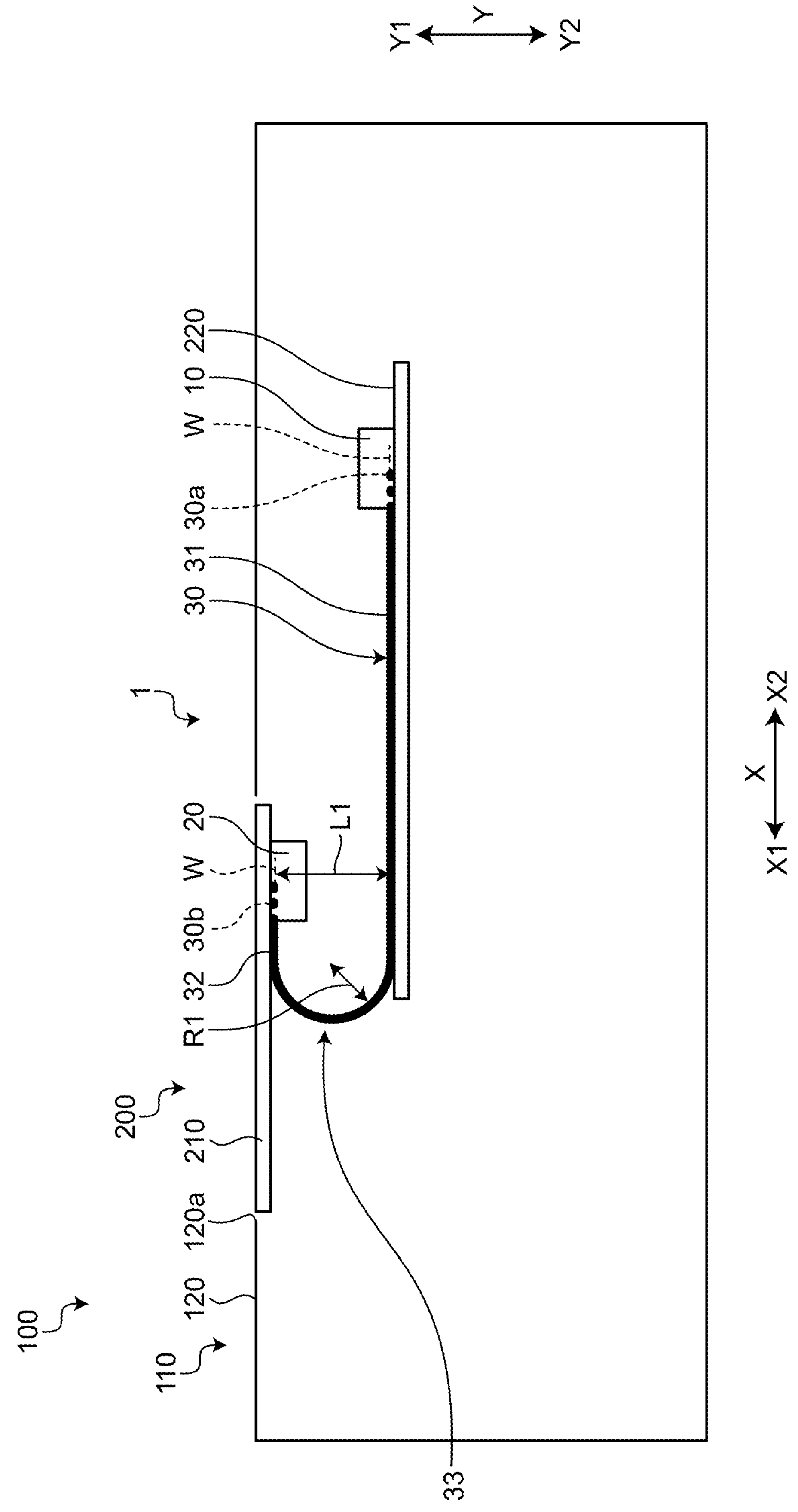
FIG. 1 is a side view of a routing structure according to an embodiment.
Figure 2:
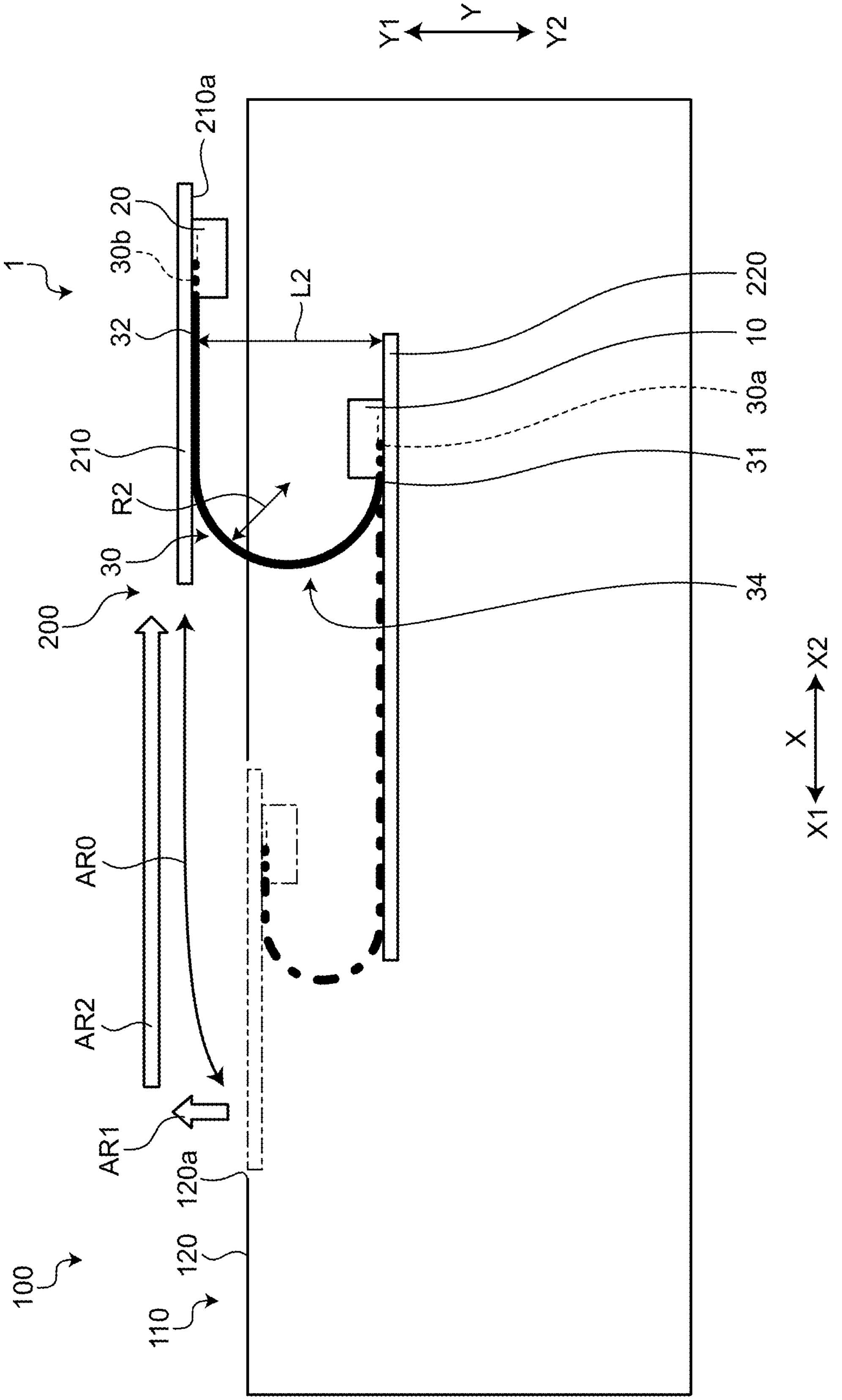
FIG. 2 is a side view of the routing structure according to the embodiment.
Figure 3:
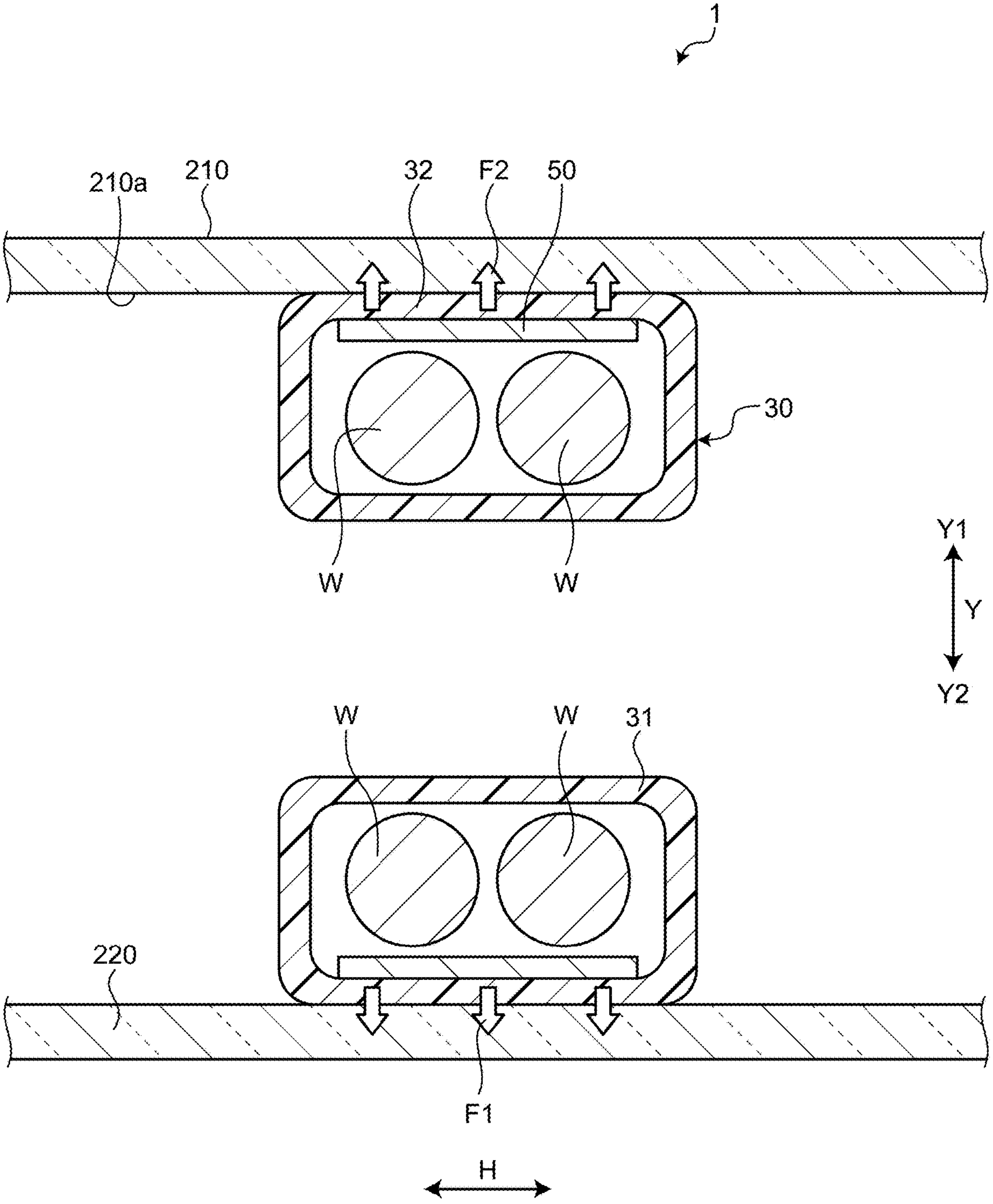
FIG. 3 is a cross-sectional view of the routing structure according to the embodiment.
Figure 4:
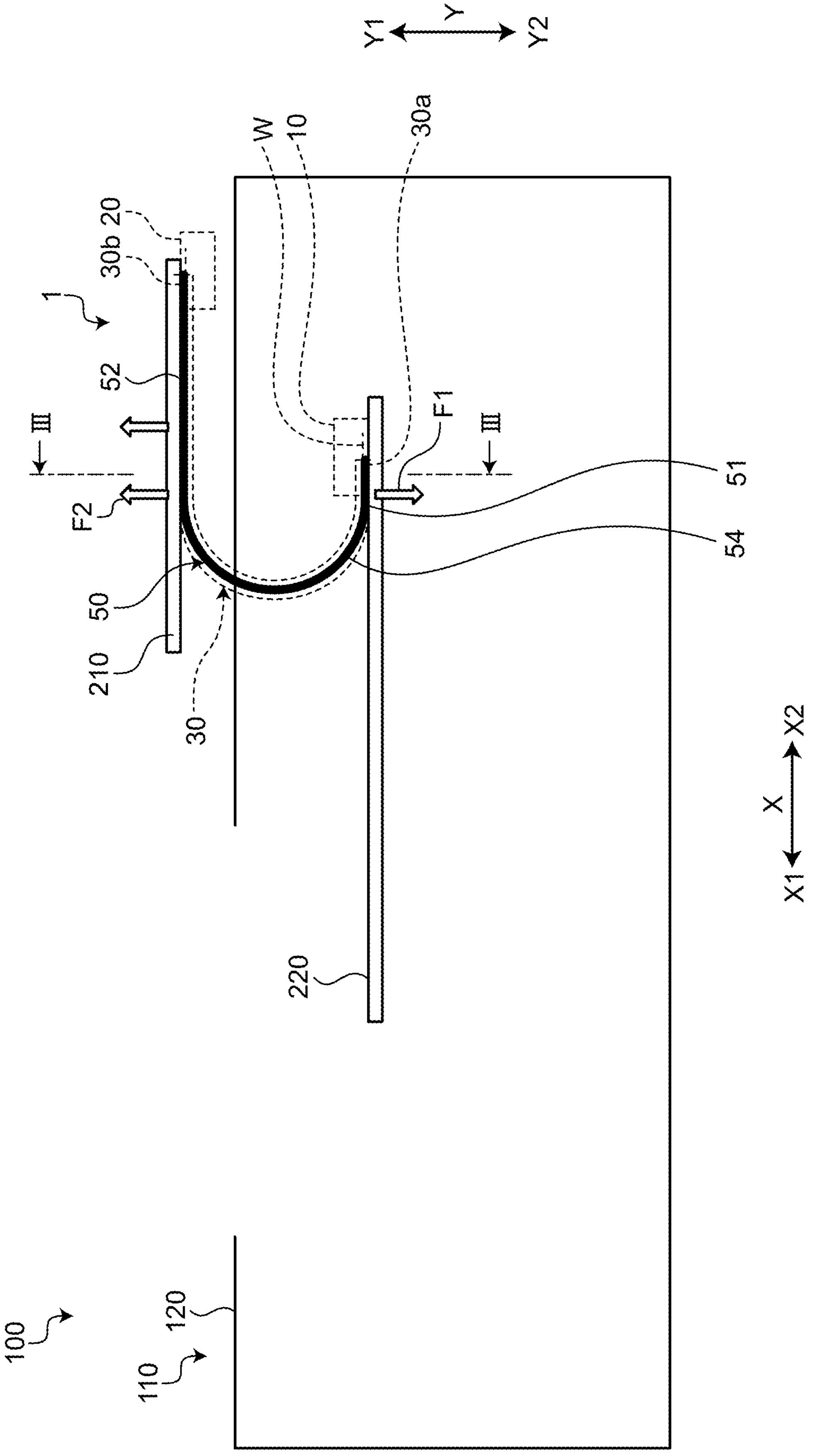
FIG. 4 is a side view of the routing structure according to the embodiment.
Figure 5:
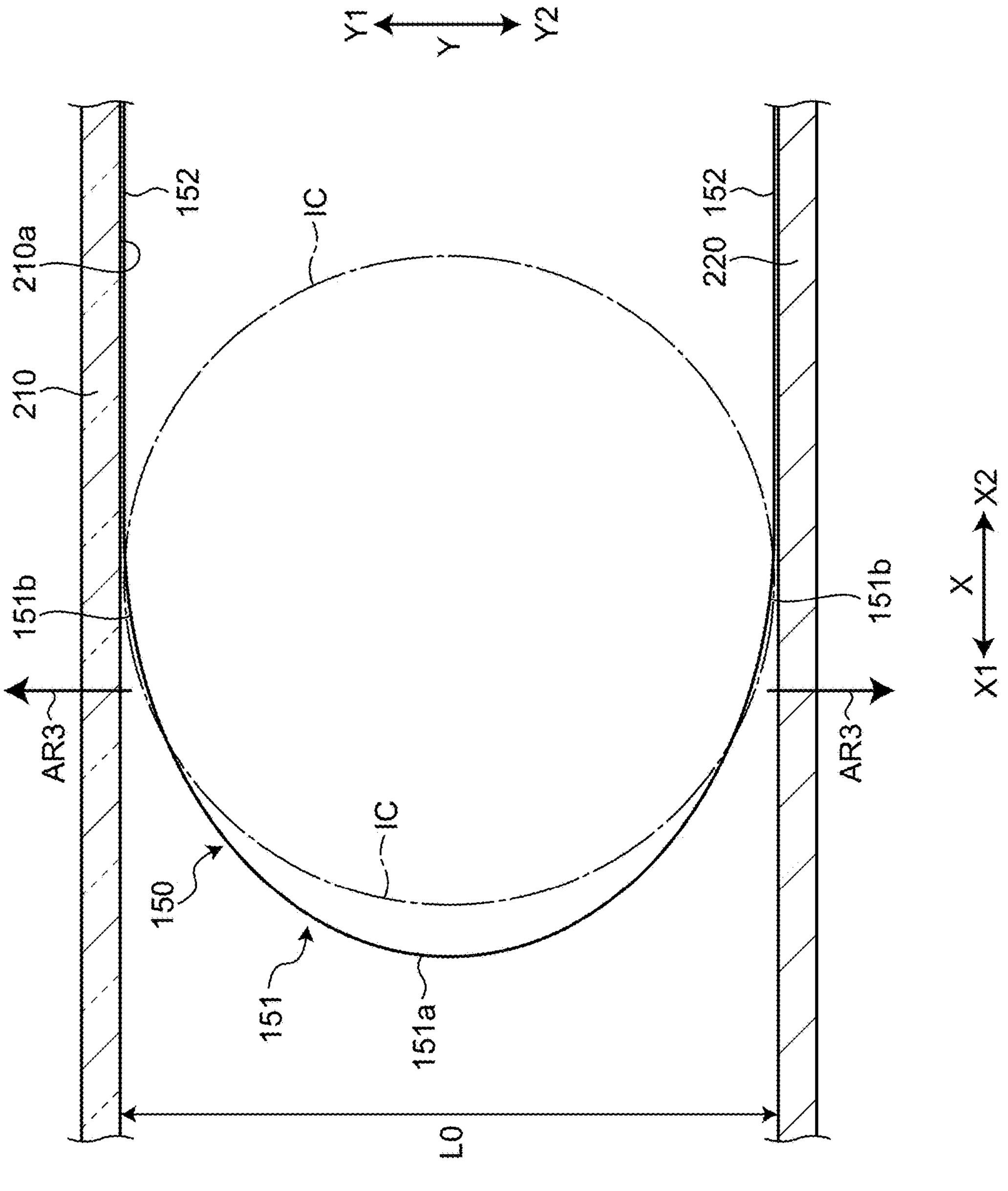
FIG. 5 is a view for explaining a tapered shape.
Figure 6:
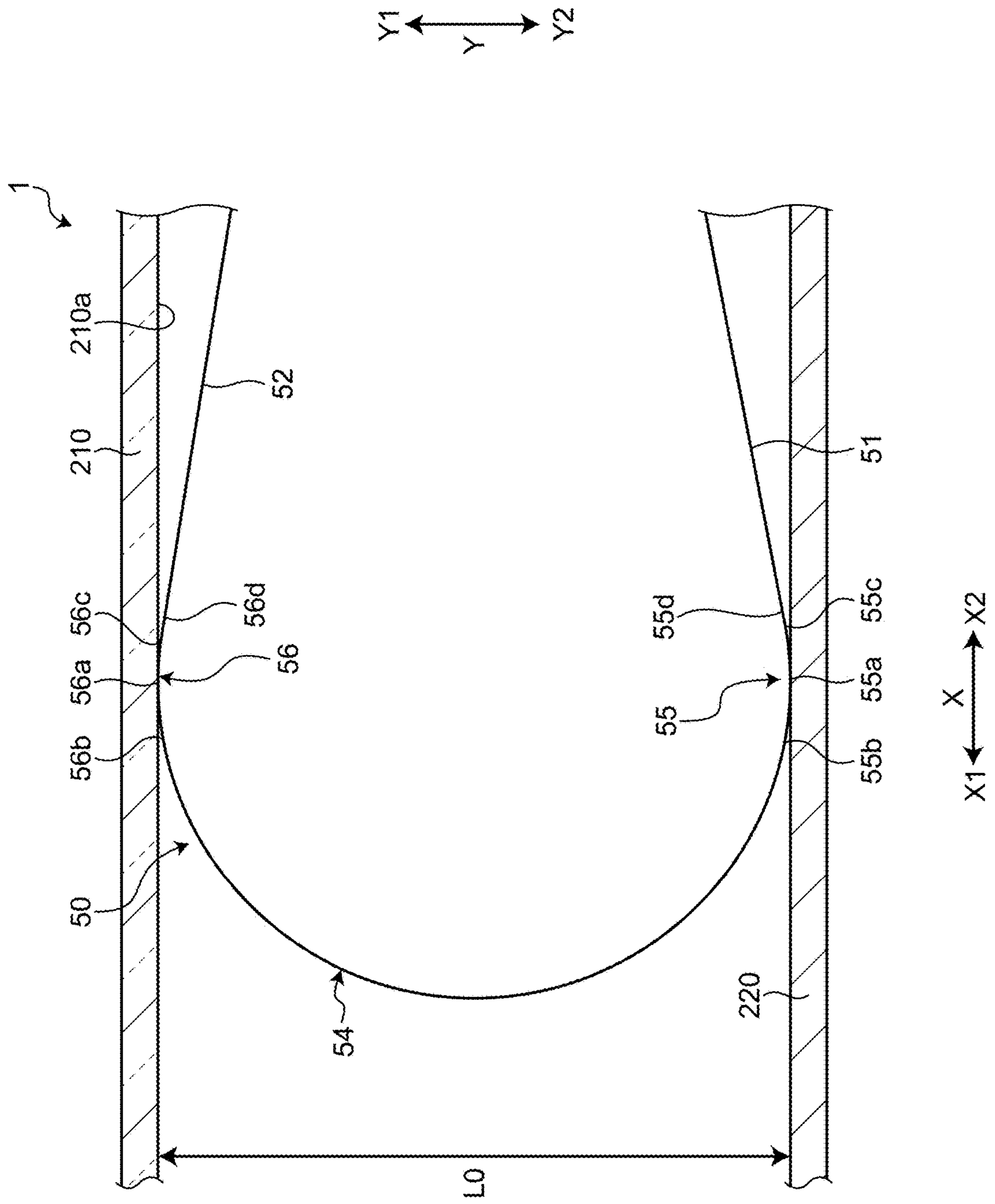
FIG. 6 is a side view of the routing structure according to the embodiment.
Figure 7:
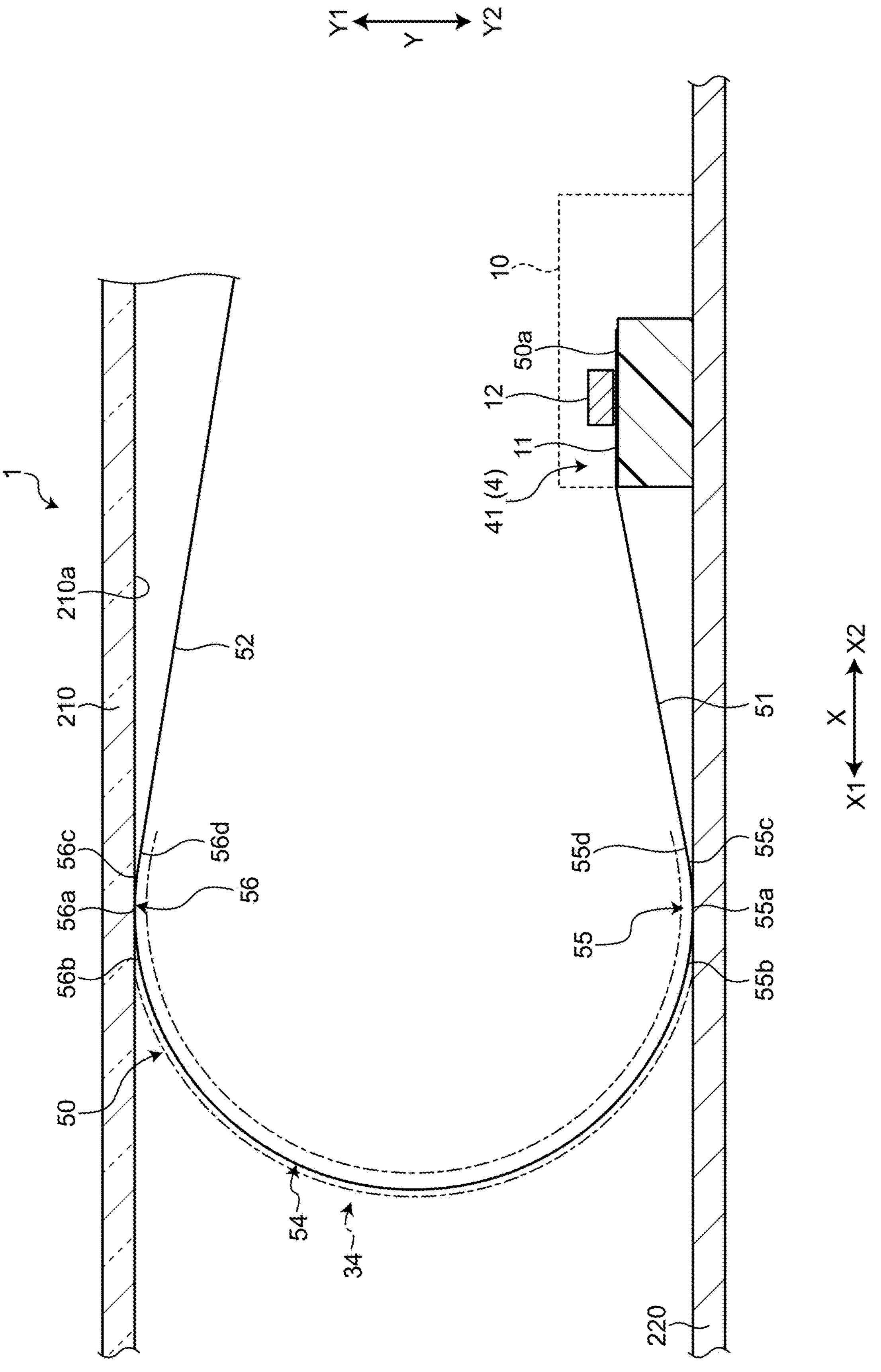
FIG. 7 is a side view of a first support structure according to the embodiment.
Figure 8:
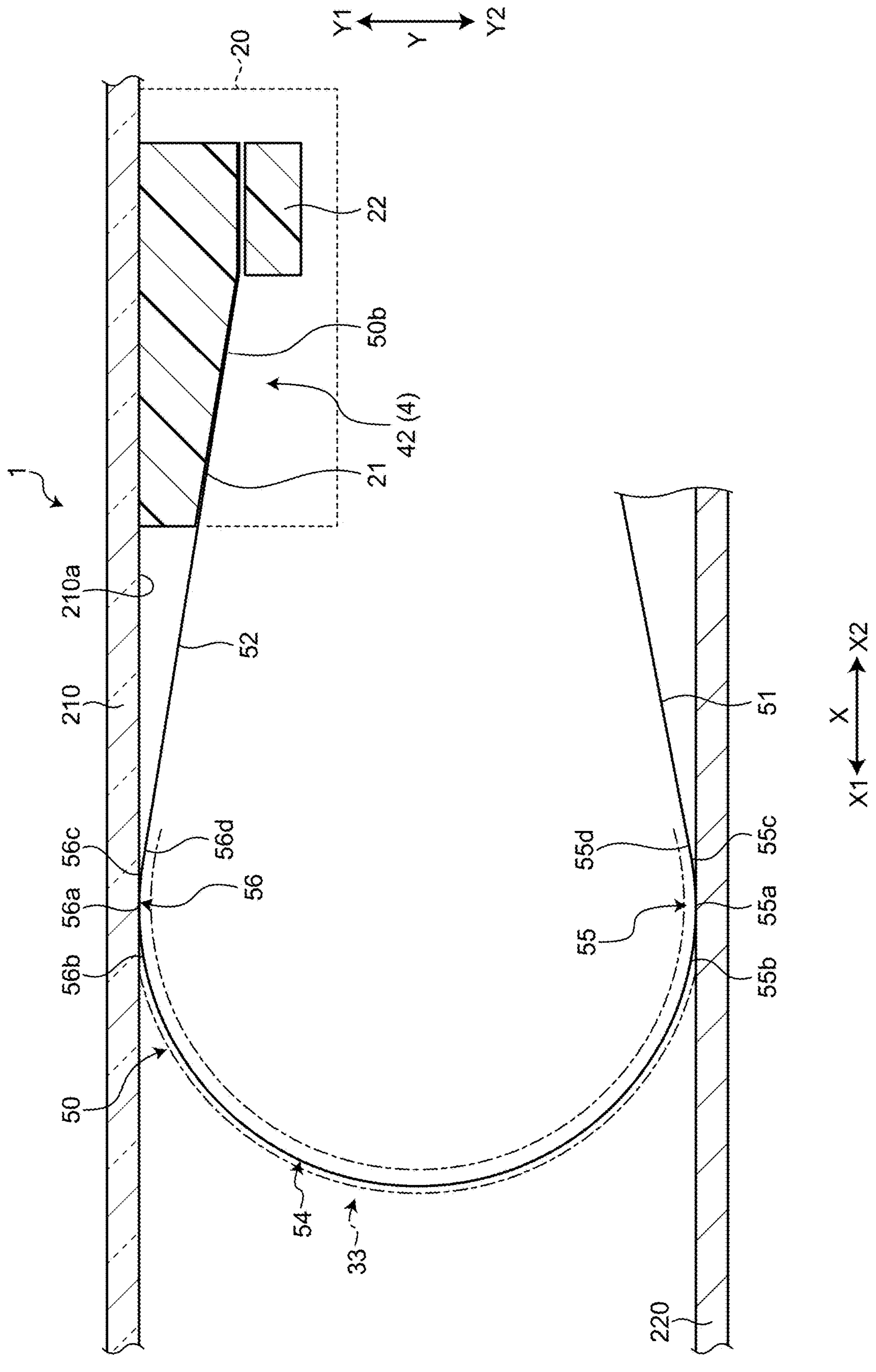
FIG. 8 is a side view of a second support structure according to the embodiment.
Figure 9:
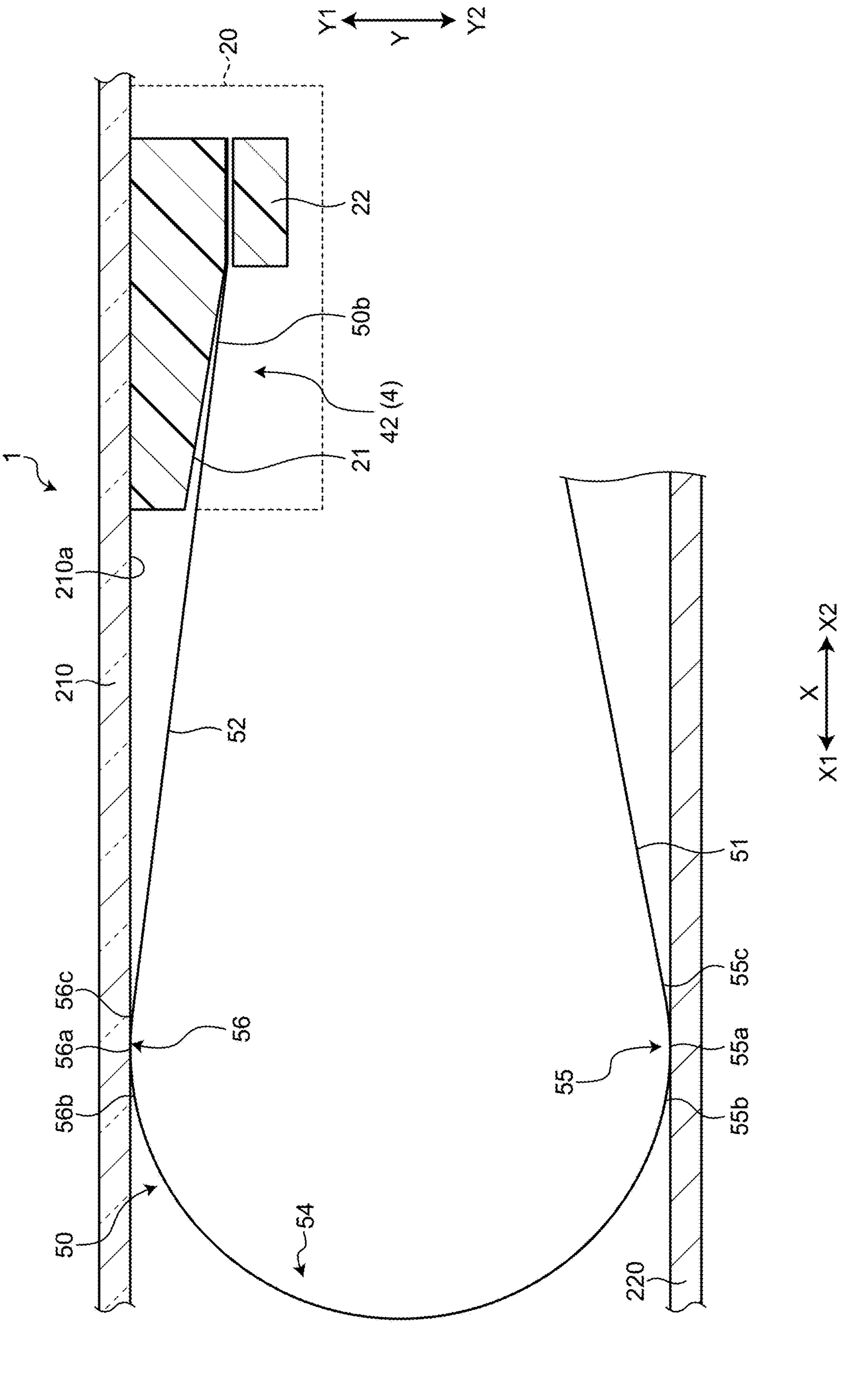
FIG. 9 is a side view of the routing structure according to the embodiment.

An embodiment will be described with reference to FIGS. 1 to 9. The present embodiment relates to a routing structure. FIGS. 1 and 2 are side views of the routing structure according to the embodiment, FIG. 3 is a cross-sectional view of the routing structure according to the embodiment, FIG. 4 is a side view of the routing structure according to the embodiment, FIG. 5 is a view for explaining a tapered shape, FIG. 6 is a side view of the routing structure according to the embodiment, FIG. 7 is a side view of a first support structure according to the embodiment, FIG. 8 is a side view of a second support structure according to the embodiment, and FIG. 9 is a side view of the routing structure according to the embodiment. FIG. 3 illustrates a cross section taken along line III-III in FIG. 4.

As illustrated in FIG. 1, a routing structure 1 according to the embodiment is applied to a sunroof 200 of a vehicle 100. The vehicle 100 is, for example, an automobile on which a power source such as a motor or an engine is mounted. The vehicle 100 includes a vehicle body 110. The vehicle body 110 has a roof 120 that covers the vehicle interior. The roof 120 has an opening 120*a* that is open upward.

The vehicle 100 includes a sunroof 200 that opens and closes the opening 120*a*. The sunroof 200 has a slide body 210, a rail 220, and a routing structure 1. The slide body 210 is a member that slides along a vehicle front-rear direction X with respect to the opening 120*a*. The slide body 210 according to the present embodiment is a plate-like member that closes the opening 120*a* or opens the opening 120*a*. The slide body 210 may be glass configured to allow light to be transmitted therethrough.

The sunroof 200 includes a mechanism such as a link mechanism that moves the slide body 210 along a predetermined path, and a drive source such as a motor that operates the above mechanism. The sunroof 200 moves the slide body 210 between a fully closed position where the opening 120*a* is closed and a fully opened position where the opening 120*a* is opened. FIG. 1 illustrates the slide body 210 at the fully closed position. FIG. 2 illustrates the slide body 210 at the fully opened position.

The rail 220 is fixed to the vehicle body 110. The rail 220 is disposed on the lower side Y2 with respect to the slide body 210, and extends in the vehicle front-rear direction X. The rail 220 supports the mechanism for moving the slide body 210, and guides the mechanism in the vehicle front-rear direction X. The rail 220 further supports an exterior member 30, and forms a first extending portion 31 on the exterior member 30.

The sunroof 200 according to the present embodiment moves the slide body 210 along a path AR0 illustrated in FIG. 2. The movement of the slide body 210 along the path AR0 includes a movement along the vehicle front-rear direction X and a movement along a vehicle up-down direction Y. When the slide body 210 moves from the fully closed position toward the fully opened position, the slide body 210 moves toward an upper side Y1 in the vehicle up-down direction Y and moves toward a rear side X2 in the vehicle front-rear direction X as indicated by an arrow AR1 in FIG. 2.

Conversely, when the slide body 210 moves from the fully opened position to the fully closed position, the slide body 210 moves toward a front side X1 in the vehicle front-rear direction X and moves toward a lower side Y2 in the vehicle up-down direction Y.

As illustrated in FIGS. 1 to 3, the routing structure 1 includes a first fixing part 10, a second fixing part 20, an exterior member 30, an electric wire W, and a biasing member 50. The exterior member 30 and the electric wire W constitute a wire harness routed between the vehicle body 110 and the slide body 210.

The first fixing part 10 is a member fixed to the vehicle body 110 of the vehicle 100. The first fixing part 10 according to the present embodiment is fixed to the rail 220. The first fixing part 10 may be a protector that protects the electric wire W. The first fixing part 10 is formed of, for example, an insulating synthetic resin. The first fixing part 10 has a space in which the electric wire W is routed and has a holding structure for holding the exterior member 30.

The second fixing part 20 is a member fixed to the slide body 210 of the sunroof 200. The second fixing part 20 may be a protector that protects the electric wire W. The second fixing part 20 is formed of, for example, an insulating synthetic resin. The second fixing part 20 has a space in which the electric wire W is routed and has a holding structure for holding the exterior member 30.

The exterior member 30 is an elastically deformable tubular member. The exterior member 30 is, for example, a member called a corrugated tube. The exterior member 30 is formed of, for example, an insulating synthetic resin. The exterior member 30 may have a bellows shape.

The exterior member 30 has a first end portion 30*a* held by the first fixing part 10 and a second end portion 30*b* held by the second fixing part 20. The first fixing part 10 holds the first end portion 30*a* such that the exterior member 30 extends from the first fixing part 10 along the rail 220 in the vehicle front-rear direction X. The first fixing part 10 according to the present embodiment holds the first end portion 30*a* such that the exterior member 30 extends from the first fixing part 10 toward the front side X1.

The second fixing part 20 holds the second end portion 30*b* such that the exterior member 30 extends from the second fixing part 20 along the slide body 210 in the vehicle front-rear direction X. The second fixing part 20 according to the present embodiment holds the second end portion 30*b* such that the exterior member 30 extends from the second fixing part 20 toward the front side X1.

The electric wire W and the biasing member 50 are inserted through the exterior member 30. The electric wire W is, for example, a sheathed electric wire having a stranded wire and a sheath. The electric wire W may be a flat routing material, a printed circuit body, or another circuit body. The electric wire W drawn out from the first end portion 30*a* is connected to a power supply and a control device disposed in the vehicle body 110. The electric wire W drawn out from the second end portion 30*b* is connected to a load disposed on the slide body 210. The load disposed on the slide body 210 may be, for example, a lighting device, a light control film disposed on the glass of the slide body 210, or another electric load.

As illustrated in FIGS. 1 and 2, the exterior member 30 has a curved portion 33 or 34 that is curved in the vehicle front-rear direction X between the first end portion 30*a* and the second end portion 30*b*. The curved portion 33 or 34 is formed by the biasing member 50. The curved portion 33 illustrated in FIG. 1 is a curved portion formed in the exterior member 30 in a state where the slide body 210 is at the fully closed position. The curved portion 33 has a radius R1. The curved portion 34 illustrated in FIG. 2 is a curved portion formed in the exterior member 30 in a state where the slide body 210 is at the fully opened position. The curved portion 34 has a radius R2. The electric wire W in which the curved portion 33 or 34 is formed has a U shape or a J shape.

As illustrated in FIG. 1, when the slide body 210 is at the fully closed position, a distance of the second end portion 30*b* from the first end portion 30*a* in the vehicle up-down direction Y is a first distance L1. The radius R1 of the curved portion 33 is half the first distance L1.

As illustrated in FIG. 2, when the slide body 210 is at the fully opened position, a distance of the second end portion 30*b* from the first end portion 30*a* in the vehicle up-down direction Y is a second distance L2. The radius R2 of the curved portion 34 is half the second distance L2.

In the sunroof 200 according to the present embodiment, the second distance L2 at the fully opened position is larger than the first distance L1 at the fully closed position. Accordingly, the radius R1 of the curved portion 33 when the slide body 210 is at the fully closed position is smaller than the radius R2 of the curved portion 34 when the slide body 210 is at the fully opened position. In addition, the radius R1 when the slide body 210 is at the fully closed position is smaller than a radius of a curved shape formed in the biasing member 50 when the slide body 210 is at another position. In other words, the curved shape formed in the biasing member 50 has a smallest radius when the slide body 210 is at the fully closed position.

The second end portion 30*b* of the exterior member 30 moves together with the slide body 210. At this time, the exterior member 30 follows the movement of the second fixing part 20 while gradually changing the position where the curved shape is formed.

The biasing member 50 according to the present embodiment is a member that presses the exterior member 30 toward the slide body 210. The biasing member 50 according to the present embodiment is a plate-like member, and is elastically deformable. The biasing member 50 is formed of a metal or a resin. The biasing member 50 extends from the first end portion 30*a* to the second end portion 30*b* of the exterior member 30.

As illustrated in FIG. 3, the exterior member 30 according to the present embodiment has a rectangular cross-sectional shape. The exemplified shape of the biasing member 50 is a substantially flat plate shape. In the biasing member 50, a cross-sectional shape orthogonal to an axial direction of the biasing member 50 is rectangular. The biasing member 50 extends from one end to the other end in a width direction H in the internal space of the exterior member 30. The biasing member 50 faces each of a plurality of electric wires W in the vehicle up-down direction Y. In other words, the biasing member 50 has a width capable of supporting the plurality of electric wires W.

The biasing member 50 in FIG. 3 is disposed outside the electric wire W. Therefore, in the curved portion 33 or 34, the biasing member 50 is positioned outside the electric wire W in a radial direction. As illustrated in FIG. 3, the biasing member 50 is in contact with the exterior member 30, and applies pressing forces F1 and F2 to the exterior member 30 on the contact surface.

As illustrated in FIG. 4, the exterior member 30, the electric wire W, and the biasing member 50 are routed in a curved state in a U shape or a J shape. That is, the biasing member 50 extends from the first fixing part 10 to the second fixing part 20 with a curved portion 54.

The biasing member 50 bent to have the curved portion 54 applies the pressing force F1 and the pressing force F2 to the exterior member 30. The pressing force F1 is a force in the vehicle up-down direction Y, and presses the exterior member 30 toward the rail 220. The pressing force F2 is a force in the vehicle up-down direction Y, and presses the exterior member 30 toward the slide body 210. The pressing forces F1 and F2 are restoring forces generated in the bent biasing member 50.

The pressing force F1 forms a first extending portion 31 in the exterior member 30. The pressing force F2 forms a second extending portion 32 in the exterior member 30. As illustrated in FIG. 2, etc., the second extending portion 32 is a portion extending along a vehicle interior side surface 210*a* of the slide body 210. The vehicle interior side surface 210*a* is a surface facing the lower side Y2.

The biasing member 50 according to the present embodiment is configured to press the exterior member 30 toward the slide body 210 both when the slide body 210 is at the fully closed position and when the slide body 210 is at the fully opened position. In other words, the biasing member 50 has rigidity capable of pressing the exterior member 30 against and in contact with the slide body 210 at all times. Therefore, the routing structure 1 according to the present embodiment can stabilize the shape of the exterior member 30. The biasing member 50 can keep the exterior member 30 in contact with the slide body 210 against an external force such as a vibration generated, for example, during traveling.

As will be described below, the routing structure 1 according to the present embodiment is configured to suppress the biasing member 50 from having a tapered shape. First, a tapered shape formed in a biasing member will be described.

FIG. 5 illustrates a tapered shape formed in a biasing member 150 according to a comparative example. The biasing member 150 according to the comparative example has a plate shape similar to that of the biasing member 50 according to the embodiment. The biasing member 150 has a curved portion 151 and straight portions 152. The straight portions 152 are portions extending straight, and are formed along the slide body 210 and the rail 220, respectively.

The curved portion 151 has a leading end portion 151*a* and two tail end portions 151*b*. The leading end portion 151*a* is a central portion of the curved portion 151, and has a convex shape in the vehicle front-rear direction X. The tail end portions 151*b* are end portions of the curved portion 151 in the vehicle up-down direction Y, and are portions connected to the straight portions 152. The curved portion 151 has a tapered shape. More specifically, the shape of the curved portion 151 is a shape in which the bending radius decreases from the tail end portion 151*b* toward the leading end portion 151*a*.

FIG. 5 illustrates a virtual circle IC. The virtual circle IC is a circle whose diameter is a distance L0 in the vehicle up-down direction Y from the rail 220 to the slide body 210. The bending radius of the leading end portion 151*a* is smaller than the radius of the virtual circle IC. In the curved portion 151 having a tapered shape, the leading end portion 151*a* has a smaller bending radius than the tail end portion 151*b*.

It is considered that the tapered shape is formed in the curved portion 151 because of a reaction force acting on the tail end portion 151*b*. In the biasing member 150 illustrated in FIG. 5, the straight portions 152 are supported by the slide body 210 and the rail 220. In this case, the tail end portion 151*b* is a portion whose shape gradually changes from a straight shape to an arcuate shape. In the following description, a range in which the shape gradually changes from the straight shape to the arcuate shape in the biasing member 50 or 150 is simply referred to as a “gradual change range”.

As indicated by an arrow AR3 in FIG. 5, a force in the vehicle up-down direction Y acts on the tail end portion 151*b* to bring the tail end portion 151*b* close to the straight shape. Due to this force, the bending radius of the tail end portion 151*b* tends to have a larger value than the radius of the virtual circle IC. As a result, it is considered that a tapered shape in which the bending radius of the leading end portion 151*a* is smaller than the radius of the virtual circle IC is formed.

FIG. 6 illustrates the curved portion 54 formed in the biasing member 50 according to the present embodiment. In FIG. 6, the electric wire W and the exterior member 30 are omitted in order to explain the shape of the curved portion 54. The curved portion 54 formed in the biasing member 50 according to the present embodiment includes a first arcuate portion 55 and a second arcuate portion 56.

The first arcuate portion 55 is formed in a portion of the curved portion 54 along the rail 220. The first arcuate portion 55 has an arcuate shape convex toward the lower side Y2 in the vehicle up-down direction Y. That is, the first arcuate portion 55 faces the rail 220, and is curved toward the rail 220. The first arcuate portion 55 has an apex 55*a* that is a lower end of the curved portion 54.

The first arcuate portion 55 has inclined portions 55*b* and 55*c* on both the front side X1 and the rear side X2 with respect to the apex 55*a*. The first inclined portion 55*b* is located on the front side X1 with respect to the apex 55*a*. The second inclined portion 55*c* is located on the rear side X2 with respect to the apex 55*a*. The first inclined portion 55*b* and the second inclined portion 55*c* are inclined to be closer to the upper side Y1 as being farther from the apex 55*a*. That is, each of the two inclined portions 55*b* and 55*c* is inclined with respect to the rail 220, and becomes more distant from the rail 220 as being farther from the apex 55*a*. Each of the first inclined portion 55*b* and the second inclined portion 55*c* has an arcuate shape.

The biasing member 50 has a first extending portion 51 extending straight from the first arcuate portion 55 toward the first fixing part 10. A boundary 55*d* between the first arcuate portion 55 and the first extending portion 51 is located on the rear side X2 with respect to the apex 55*a*.

By forming the second inclined portion 55*c* in the biasing member 50, the gradual change range is shifted to the first extending portion 51 side. In other words, the gradual change range includes a portion on the rear side X2 with respect to the apex 55*a* of the biasing member 50. As a result, the bending radius of the first inclined portion 55*b* becomes close to the radius of the virtual circle IC determined by the distance L0, so that the curved portion 54 is suppressed from having a tapered shape.

The second arcuate portion 56 is formed in a portion of the curved portion 54 along the slide body 210. The second arcuate portion 56 has an arcuate shape convex toward the upper side Y1 in the vehicle up-down direction Y. That is, the second arcuate portion 56 faces the vehicle interior side surface 210*a* of the slide body 210, and is curved toward the vehicle interior side surface 210*a*. The second arcuate portion 56 has an apex 56*a* that is an upper end of the curved portion 54.

The second arcuate portion 56 has inclined portions 56*b* and 56*c* on both the front side X1 and the rear side X2 with respect to the apex 56*a*. The first inclined portion 56*b* is located on the front side X1 with respect to the apex 56*a*. The second inclined portion 56*c* is located on the rear side X2 with respect to the apex 56*a*. The first inclined portion 56*b* and the second inclined portion 56*c* are inclined to be closer to the lower side Y2 as being farther from the apex 56*a*. That is, each of the two inclined portions 56*b* and 56*c* is inclined with respect to the vehicle interior side surface 210*a*, and becomes more distant from the vehicle interior side surface 210*a* as being farther from the apex 56*a*. Each of the first inclined portion 56*b* and the second inclined portion 56*c* has an arcuate shape.

The biasing member 50 has a second extending portion 52 extending straight from the second arcuate portion 56 toward the second fixing part 20. A boundary 56*d* between the second arcuate portion 56 and the second extending portion 52 is located on the rear side X2 with respect to the apex 56*a*.

By forming the second inclined portion 56*c* in the biasing member 50, the gradual change range is shifted to the second extending portion 52 side. In other words, the gradual change range includes a portion on the rear side X2 with respect to the apex 56*a* of the biasing member 50. As a result, the bending radius of the first inclined portion 56*b* becomes close to the radius of the virtual circle IC determined by the distance L0, so that the curved portion 54 is suppressed from having a tapered shape.

The routing structure 1 according to the present embodiment has a support structure 4 that forms the first arcuate portion 55 and the second arcuate portion 56. The support structure 4 according to the present embodiment has both a first support structure 41 and a second support structure 42 to be described below.

As will be described with reference to FIG. 7, the first arcuate portion 55 is formed by the first support structure 41. The exemplified first support structure 41 is provided in the first fixing part 10. The first support structure 41 has a support surface 11. The support surface 11 is a surface of the first fixing part 10, and faces the upper side Y1 in the vehicle up-down direction Y. The support surface 11 is separated from the rail 220, and is located on the upper side Y1 with respect to the rail 220.

The support surface 11 supports a first end portion 50*a* of the biasing member 50. The first end portion 50*a* is an end portion corresponding to the first end portion 30*a* of the exterior member 30. The first end portion 50*a* may be fixed to the support surface 11 by a fixing member 12. The fixing member 12 may be an adhesive tape or a band member such as a binding band. The support surface 11 supports the first end portion 50*a* at a position separated from the rail 220. As a result, the first arcuate portion 55 and the first extending portion 51 are formed in the biasing member 50. The position of the support surface 11 relative to the rail 220 is determined so that the first arcuate portion 55 having an appropriate shape can be formed.

In FIG. 7, the biasing member 50 when the slide body 210 is at the fully opened position is illustrated. In this case, the curved portion 54 of the biasing member 50 forms the curved portion 34 in the exterior member 30 at the fully opened position. By suppressing the curved portion 54 from having a tapered shape at the fully opened position, a decrease in bending durability of the electric wire W is suppressed.

As will be described with reference to FIG. 8, the second arcuate portion 56 is formed by the second support structure 42. The exemplified second support structure 42 is provided in the second fixing part 20. The second support structure 42 has a support surface 21 and a clamping portion 22. The support surface 21 is a surface of the second fixing part 20, and faces the lower side Y2 in the vehicle up-down direction Y. The support surface 21 is separated from the slide body 210, and is located on the lower side Y2 with respect to the slide body 210. The support surface 21 is an inclined surface inclined with respect to the vehicle front-rear direction X. The support surface 21 is inclined to become more distant from the slide body 210 toward the rear side X2 in the vehicle front-rear direction X.

The support surface 21 supports a second end portion 50*b* of the biasing member 50. The second end portion 50*b* is an end portion corresponding to the second end portion 30*b* of the exterior member 30. A part of the second end portion 50*b* is clamped by the clamping portion 22. The clamping portion 22 clamps the second end portion 50*b* from both sides in the vehicle up-down direction Y to hold the second end portion 50*b*. The clamping portion 22 clamps, for example, a portion of the second end portion 50*b* on the rear side X2.

The support surface 21 supports the second end portion 50*b* at a position separated from the slide body 210. As a result, the second arcuate portion 56 and the second extending portion 52 are formed in the biasing member 50. The position of the support surface 21 relative to the slide body 210 is determined so that the second arcuate portion 56 having an appropriate shape can be formed.

In FIG. 8, the biasing member 50 when the slide body 210 is at the fully closed position is illustrated. In this case, the curved portion 54 of the biasing member 50 forms the curved portion 33 in the exterior member 30 at the fully closed position. At the fully closed position, the distance between the rail 220 and the slide body 210 in the vehicle up-down direction Y is smallest. By suppressing the curved portion 54 from having a tapered shape at the fully closed position, a decrease in bending durability of the electric wire W is suppressed.

The support surface 21 can regulate the inclination angle of the second extending portion 52. Further, the support surface 21 can stabilize the shape of the second extending portion 52, and suppress the vibration of the second extending portion 52. The portion having the support surface 21 may be formed of rubber or the like capable of absorbing the vibration.

As illustrated in FIG. 7, the routing structure 1 according to the present embodiment is configured to form both the first arcuate portion 55 and the second arcuate portion 56 in the curved portion 54 when the slide body 210 is at the fully opened position. The second support structure 42 is configured to form the second arcuate portion 56 when the slide body 210 is at the fully opened position. For example, the position of the clamping portion 22 in the vehicle up-down direction Y illustrated in FIG. 8 is determined so that the second arcuate portion 56 can be formed at the fully opened position.

When the slide body 210 moves, the biasing member 50 may be separated from the support surface 21 as illustrated in FIG. 9. For example, when the slide body 210 moves from the fully closed position to the fully opened position toward the rear side X2, the curved portion 54 of the biasing member 50 becomes farther from the second fixing part 20. At this time, the second end portion 50*b* of the biasing member 50 may be separated from the support surface 21. The clamping portion 22 can hold the second end portion 50*b* at a position separated from the slide body 210, and can form the second arcuate portion 56 in the curved portion 54.

As illustrated in FIG. 8, the routing structure 1 according to the present embodiment is configured to form both the first arcuate portion 55 and the second arcuate portion 56 in the curved portion 54 when the slide body 210 is at the fully closed position. The first support structure 41 is configured to form the first arcuate portion 55 when the slide body 210 is at the fully closed position. For example, the position of the support surface 11 in the vehicle up-down direction Y illustrated in FIG. 7 is determined so that the first arcuate portion 55 can be formed at the fully closed position.

The support structure 4 may be configured to form both the first arcuate portion 55 and the second arcuate portion 56 when slide body 210 is located at any position from the fully closed position to the fully opened position. Such a support structure 4 is realized by the first support structure 41 and the second support structure 42 as described above. For example, the second support structure 42 configured to form the second arcuate portion 56 when the slide body 210 is at the fully opened position can always form the second arcuate portion 56 when the slide body 210 is at any position from the fully closed position to the fully opened position. For example, the first support structure 41 configured to form the first arcuate portion 55 when the slide body 210 is at the fully closed position can always form the first arcuate portion 55 when the slide body 210 is at any position from the fully closed position to the fully opened position.

The support surface 11 of the first support structure 41 may be an inclined surface inclined with respect to the rail 220. In this case, the support surface 11 is inclined to become more distant from the rail 220 toward the rear side X2 in the vehicle front-rear direction X. The support surface 21 of the second support structure 42 may not be inclined with respect to the slide body 210.

The first support structure 41 may be a member separate from the first fixing part 10. For example, a first support member having a support surface 11 may be provided adjacent to the first fixing part 10. The first support member may include a fixing member 12. The second support structure 42 may be a member separate from the second fixing part 20. For example, a second support member having a support surface 21 may be provided adjacent to the second fixing part 20. The second support member may have a clamping portion 22.

The support structure 4 may have only one of the first support structure 41 and the second support structure 42. For example, the support structure 4 may have the first support structure 41, and may not have the second support structure 42. In this case, the second extending portion 52 can extend in contact with the slide body 210. For example, the support structure 4 may have the second support structure 42, and may not have the first support structure 41.

As described above, the routing structure 1 according to the present embodiment includes a first fixing part 10, a second fixing part 20, an exterior member 30, an electric wire W, a biasing member 50, and a support structure 4. The first fixing part 10 is fixed to a rail 220. The rail 220 is disposed on a vehicle body 110 of a vehicle 100, and extends in the vehicle front-rear direction X. The second fixing part 20 is fixed to a slide body 210. The slide body 210 extends along the vehicle front-rear direction X with respect to an opening 120*a* provided in a roof 120 of the vehicle body 110. The exterior member 30 is a tubular member having a first end portion 30*a* held by the first fixing part 10 and a second end portion 30*b* held by the second fixing part 20. The electric wire W and the biasing member 50 are inserted through the exterior member 30.

The biasing member 50 has a curved portion 54 that is curved in the vehicle front-rear direction X at a position between the first end portion 30*a* and the second end portion 30*b*. The support structure 4 supports the biasing member 50. The support structure 4 has at least one of a first support structure 41 and a second support structure 42. The first support structure 41 forms a first arcuate portion 55 in the curved portion 54. The second support structure 42 forms a second arcuate portion 56 in the curved portion 54.

The first arcuate portion 55 is formed in a portion of the curved portion 54 along the rail 220, and has an arcuate shape convex toward a lower side Y2 in the vehicle up-down direction Y. The second arcuate portion 56 is formed in a portion of the curved portion 54 along the slide body 210, and has an arcuate shape convex toward an upper side Y1 in the vehicle up-down direction Y. In the routing structure 1 according to the present embodiment, by forming at least one of the first arcuate portion 55 and the second arcuate portion 56 in the curved portion 54 of the biasing member 50, the curved portion 54 of the biasing member 50 can be suppressed from having a tapered shape.

The first arcuate portion 55 according to the present embodiment has an apex 55*a* that is a lower end of the curved portion 54, and a pair of inclined portions 55*b* and 55*c* formed on both sides in the vehicle front-rear direction X with respect to the apex 55*a*. The pair of inclined portions 55*b* and 55*c* are inclined toward the upper side Y1 in the vehicle up-down direction Y as being farther from the apex 55*a*. The first arcuate portion 55 having such a shape can suppress the curved portion 54 from having a tapered shape.

The second arcuate portion 56 according to the present embodiment has an apex 56*a* that is an upper end of the curved portion 54, and a pair of inclined portions 56*b* and 56*c* formed on both sides in the vehicle front-rear direction X with respect to the apex 56*a*. The pair of inclined portions 56*b* and 56*c* is inclined toward the lower side Y2 in the vehicle up-down direction Y as being farther from the apex 56*a*. The second arcuate portion 56 having such a shape can suppress the curved portion 54 from having a tapered shape.

The slide body 210 according to the present embodiment moves between a fully closed position where the opening

120a is closed and a fully opened position where the opening 120a is opened. The support structure 4 includes both the first support structure 41 and the second support structure 42. The first support structure 41 is configured to form the first arcuate portion 55 when the slide body 210 is at any position from the fully closed position to the fully opened position. The second support structure 42 is configured to form the second arcuate portion 56 when the slide body 210 is at any position from the fully closed position to the fully opened position. Since the first arcuate portion 55 and the second arcuate portion 56 are always formed, the curved portion 54 is appropriately suppressed from having a tapered shape.

The arrangement and structure of the first support structure 41 and the second support structure 42 are not limited to the arrangement and structure exemplified in the embodiment. The exterior member 30 is not limited to a so-called corrugated tube. The exterior member 30 may be a braided tube or another member used as an exterior member.

The biasing member 50 may be disposed inside the electric wire W. That is, the biasing member 50 may be disposed inside the electric wire W in the radial direction in the curved portion 33 or 34. The biasing member 50 is not limited to a plate-like member. The biasing member 50 may be a round bar having a circular cross-sectional shape, or may be a rod-like member having a polygonal cross-sectional shape.

The embodiments disclosed above can be carried out in an appropriate combination.

The routing structure according to the present embodiment has a support structure supporting the biasing member. The support structure includes at least one of a first support structure that forms a first arcuate portion in the curved portion and a second support structure that forms a second arcuate portion in the curved portion. The first arcuate portion is formed in a portion of the curved portion along the rail and has an arcuate shape convex toward the lower side in the vehicle up-down direction, and the second arcuate portion is formed in a portion of the curved portion along the slide body and has an arcuate shape convex toward the upper side in the vehicle up-down direction. The routing structure according to the present embodiment is capable of suppressing the biasing member from having a tapered shape by forming at least one of the first arcuate portion and the second arcuate portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A routing structure comprising:

a first fixing part fixed to a rail disposed on a vehicle body of a vehicle, and extending in a vehicle front-rear direction;

a second fixing part fixed to a slide body that moves along the vehicle front-rear direction with respect to an opening provided in a roof of the vehicle body;

a tubular exterior member having a first end portion held by the first fixing part and a second end portion held by the second fixing part;

an electric wire inserted through the exterior member;

a biasing member inserted through the exterior member, and having a curved portion curved in the vehicle front-rear direction at a position between the first end portion and the second end portion; and a support structure supporting the biasing member, wherein the support structure includes at least one of a first support structure that forms a first arcuate portion in the curved portion and a second support structure that forms a second arcuate portion in the curved portion, the first arcuate portion is formed in a portion of the curved portion along the rail, and has an arcuate shape convex toward a lower side in a vehicle up-down direction, and the second arcuate portion is formed in a portion of the curved portion along the slide body, and has an arcuate shape convex toward an upper side in the vehicle up-down direction.

2. The routing structure according to claim 1, wherein the first arcuate portion includes an apex that is a lower end of the curved portion, and a pair of inclined portions formed on both sides in the vehicle front-rear direction with respect to the apex, and the pair of inclined portions are inclined toward the upper side in the vehicle up-down direction as being farther from the apex.

3. The routing structure according to claim 1, wherein the second arcuate portion includes an apex that is an upper end of the curved portion, and a pair of inclined portions formed on both sides in the vehicle front-rear direction with respect to the apex, and the pair of inclined portions are inclined toward the lower side in the vehicle up-down direction as being farther from the apex.

4. The routing structure according to claim 1, wherein the slide body moves between a fully closed position where the opening is closed and a fully opened position where the opening is opened, the support structure includes both the first support structure and the second support structure, the first support structure is configured to form the first arcuate portion when the slide body is at any position from the fully closed position to the fully opened position, and the second support structure is configured to form the second arcuate portion when the slide body is at any position from the fully closed position to the fully opened position.

* * * * *